United States Patent
Knestele et al.

(10) Patent No.: US 9,792,069 B2
(45) Date of Patent: Oct. 17, 2017

(54) OFFLINE DEDUPLICATION FOR SOLID-STATE STORAGE DEVICES

(71) Applicant: HGST Netherlands B.V., Amsterdam (NL)

(72) Inventors: Gunter Knestele, Costa Mesa, CA (US); Jeffrey L. Furlong, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 72 days.

(21) Appl. No.: 14/500,937

(22) Filed: Sep. 29, 2014

(65) Prior Publication Data

US 2016/0092138 A1   Mar. 31, 2016

(51) Int. Cl.
    *G06F 3/06* (2006.01)
(52) U.S. Cl.
    CPC .......... *G06F 3/0641* (2013.01); *G06F 3/0619* (2013.01); *G06F 3/0679* (2013.01)
(58) Field of Classification Search
    CPC ..... G06F 3/0641; G06F 3/0619; G06F 3/0679
    See application file for complete search history.

(56) References Cited

U.S. PATENT DOCUMENTS

| 8,572,053 | B2 | 10/2013 | Tofano |
| 8,583,868 | B2 | 11/2013 | Belluomini et al. |
| 8,612,699 | B2 | 12/2013 | Jain et al. |
| 2008/0215834 | A1* | 9/2008 | Dumitru ............... G06F 3/0613 711/161 |
| 2012/0102260 | A1 | 4/2012 | Kawamura et al. |
| 2012/0198139 | A1 | 8/2012 | Tanaka et al. |
| 2012/0303873 | A1 | 11/2012 | Nguyen et al. |
| 2013/0061019 | A1 | 3/2013 | Fitzpatrick et al. |
| 2013/0086006 | A1 | 4/2013 | Colgrove et al. |

(Continued)

OTHER PUBLICATIONS

Jonghwa Kim, Choonghyun Lee, Sangyup Lee, Ikjoon Son, Jongmoo Choi, Sungroh Yoon, Hu-Ung Lee, Sooyong Kang, Youjip Won, Jaehyuk Cha; "Deduplication in SSDs: Model and Quantitative Analysis"; IEEE, 2013, 12 pgs., http://storageconference.org/2012/Papers/15.Deduplication.DeduplicationInSSD.pdf, visted Apr. 2014.

(Continued)

*Primary Examiner* — Eric S Cardwell
(74) *Attorney, Agent, or Firm* — McDermott Will & Emery LLP

(57) ABSTRACT

A method for managing a flash storage system includes reading flash data units from flash memory into a buffer, wherein each of the flash data units includes host data units, and determining an identifier for each host data unit. The method includes selecting a set of unique identifiers from the determined identifiers based on a number of host data units sharing the respective unique identifier. For each unique identifier in the set of unique identifier, the method includes designating one of the host data units as a master data unit, wherein the logical address of the designated host data unit is mapped to a physical address. The logical addresses of the other host data units sharing the unique identifier are remapped to the master physical address, and the physical addresses previously mapped to the remapped logical addresses are invalidated.

23 Claims, 6 Drawing Sheets

(56) References Cited

U.S. PATENT DOCUMENTS

| | | | |
|---|---|---|---|
| 2013/0275656 A1* | 10/2013 | Talagala | G06F 12/0246 711/103 |
| 2013/0326115 A1 | 12/2013 | Goss et al. | |
| 2014/0074804 A1 | 3/2014 | Colgrove et al. | |
| 2014/0136760 A1 | 5/2014 | Sprouse et al. | |
| 2015/0019797 A1* | 1/2015 | Huang | G06F 12/0246 711/103 |

OTHER PUBLICATIONS

Jonghwa Kim, Ikjoon Son, Jongmoo Choi, Sungroh Yoon, Sooyong Kang, Youjip Won, Jaehyuk Cha; "Deduplication in SSD for Reducing Write Amplification Factor"; http://www.usenix.org/legacy/event/fast11/posters_files/Kim_j.pdf, visited Apr. 2014.

* cited by examiner

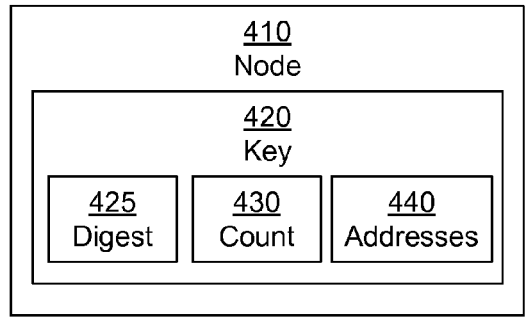
FIG. 4A
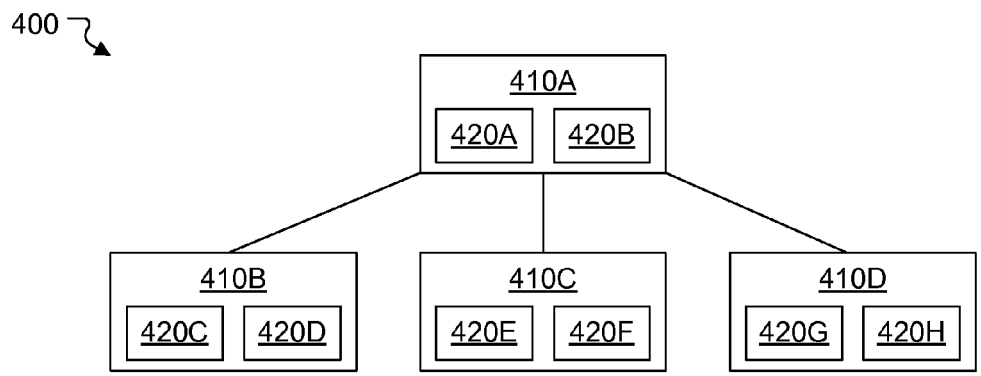
FIG. 4B
FIG. 5A
FIG. 5B

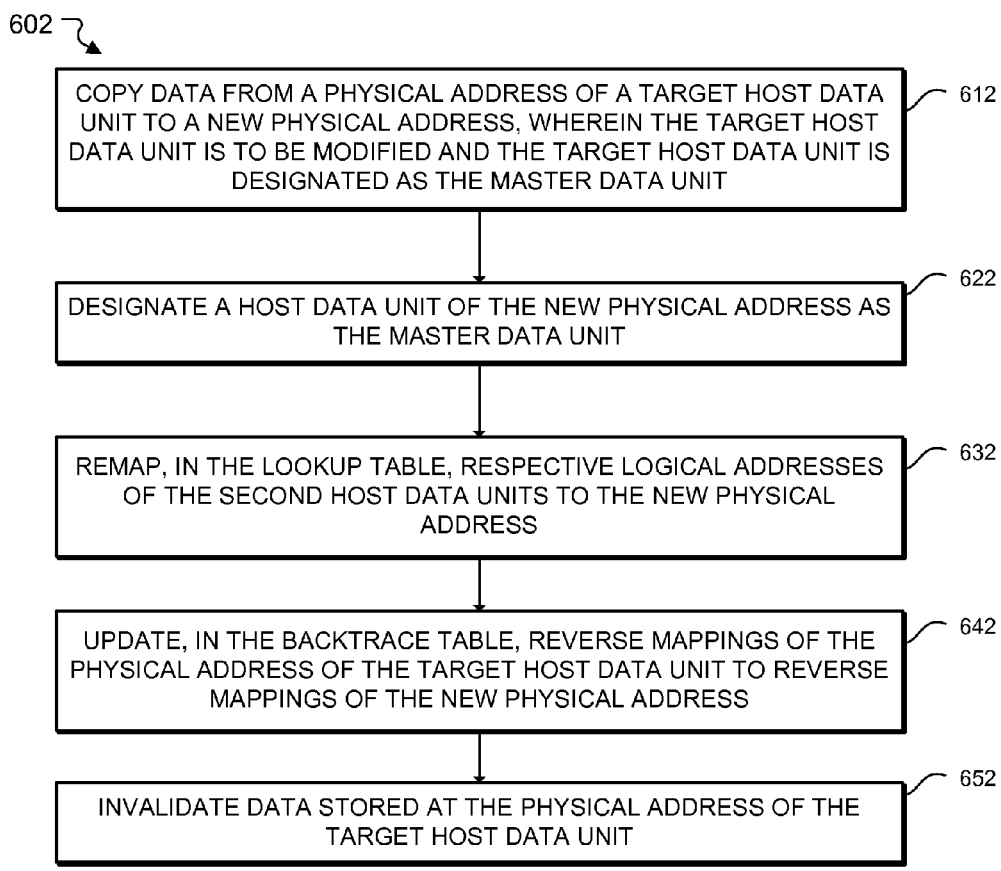

OFFLINE DEDUPLICATION FOR SOLID-STATE STORAGE DEVICES

BACKGROUND

The present disclosure concerns flash storage devices and, more particularly, offline deduplication processes for flash storage devices.

Solid-state storage devices (SSDs) may use flash memory as a non-volatile storage medium. A deduplication or dedupe process allows for more efficient use of space. In a deduplication process, duplicate data entries are removed. Rather than storing multiple copies of the same data at multiple physical addresses on the storage device, only one copy of the data is stored at a physical address, with references to that one copy replacing the other copies. Deduplication may be performed inline, as a write command is received from a host. Before writing the data, the data is compared against data already stored on the storage device. If a match is found, a reference to that match is used, rather than writing the data to a new physical address. However, this inline dedupe may add latency to write operations.

SUMMARY

According to aspects of the subject technology, a method for managing a flash storage system is provided. The method includes reading a plurality of flash data units from flash memory into a buffer, wherein each of the plurality of flash data units includes one or more host data units, and determining an identifier for each of the host data units read into the buffer. The method includes selecting a set of unique identifiers from the determined identifiers based on a number of host data units that share the respective unique identifiers. For each unique identifier in the set of unique identifiers, the method includes designating a first host data unit sharing the unique identifier as a master data unit, wherein a logical address of the first host data unit is mapped to a first physical address in the flash memory in a lookup table, remapping, in the lookup table, respective logical addresses of one or more second host data units sharing the unique identifier from respective second physical addresses in the flash memory to the first physical address in the flash memory, and invalidating data stored at the respective second physical addresses in the flash memory.

According to other aspects of the subject technology, a flash storage system is provided. The flash storage system includes a plurality of flash memory devices, a memory comprising a buffer, and a controller. The controller is configured to read a plurality of flash data units from the plurality of flash memory devices into the buffer, wherein each of the plurality of flash data units includes one or more host data units, determine an identifier for each of the host data units read into the buffer, and select a set of unique identifiers from the determined identifiers based on a number of host data units that share the respective unique identifiers. For each unique identifier in the set of unique identifiers, the controller is configured to designate a first host data unit sharing the unique identifier as a master data unit, wherein a logical address of the first host data unit is mapped to a first physical address in the flash memory device in a lookup table, remap, in the lookup table, respective logical addresses of one or more second host data units sharing the unique identifier from respective second physical addresses in the flash memory device to the first physical address in the flash memory device, and invalidate data stored at the respective second physical addresses in the flash memory device.

According to other aspects of the subject technology, a non-transitory machine-readable medium comprises instructions stored therein, which when executed by a machine, cause the machine to perform operations. The operations include reading a plurality of flash data units from flash memory into a buffer, wherein each of the plurality of flash data units includes one or more host data units, determining an identifier for each of the host data units read into the buffer, and selecting a set of unique identifiers from the determined identifiers based on a number of host data units that share the respective unique identifiers. For each unique identifier in the set of unique identifiers, the operations include designating a first host data unit sharing the unique identifier as a master data unit, wherein a logical address of the first host data unit is mapped to a first physical address in the flash memory in a lookup table, remapping, in the lookup table, respective logical addresses of one or more second host data units sharing the unique identifier from respective second physical addresses in the flash memory to the first physical address in the flash memory, and invalidating data stored at the respective second physical addresses in the flash memory.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 4A is a diagram of a node of a data structure according to aspects of the subject technology.

FIG. 4B is a diagram of a data structure comprising nodes from FIG. 4A according to aspects of the subject technology.

FIG. 5A is a diagram of a lookup table according to aspects of the subject technology.

FIG. 5B is a diagram of a backtrace table according to aspects of the subject technology.

FIG. 6B is a flowchart illustrating another method for updating deduplication entries according to aspects of the subject technology.

FIG. 7C is a diagram of another modified lookup table according to aspects of the subject technology.

FIG. 7D is a diagram of another modified backtrace table according to aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology.

An SSD may include one or more flash memory devices, each of which comprises an array of flash memory cells. The flash memory cells may be organized into physical blocks, with each physical block comprising a number of pages. Data is written to flash memory in write units of pages, where each page has the capacity to store a predetermined number of host data units or sectors. Host data files may be written sequentially to flash memory, at the next available location. However, data is erased from flash memory in erase units of physical blocks. The SSD may perform maintenance operations, which may help manage data storage/utilization and lifespan of the flash memory devices.

In a deduplication or dedupe process, storage space is more efficiently utilized by eliminating duplicate data units. During inline dedupe, when a write command is received from the host, the host data unit to be written is compared against host data units stored in the storage device. If a match is found, the target logical address of the write command is mapped to the physical address of the matching host data unit. If a match is not found, the host data unit is written to an available physical address, and the target logical address is mapped to the written physical address. However, the dedupe process may add delay to the completion of the write command. Applying deduplication during maintenance operations (offline deduplication), such as garbage collection (GC), may avoid the write latency during host write commands.

Figure 1:
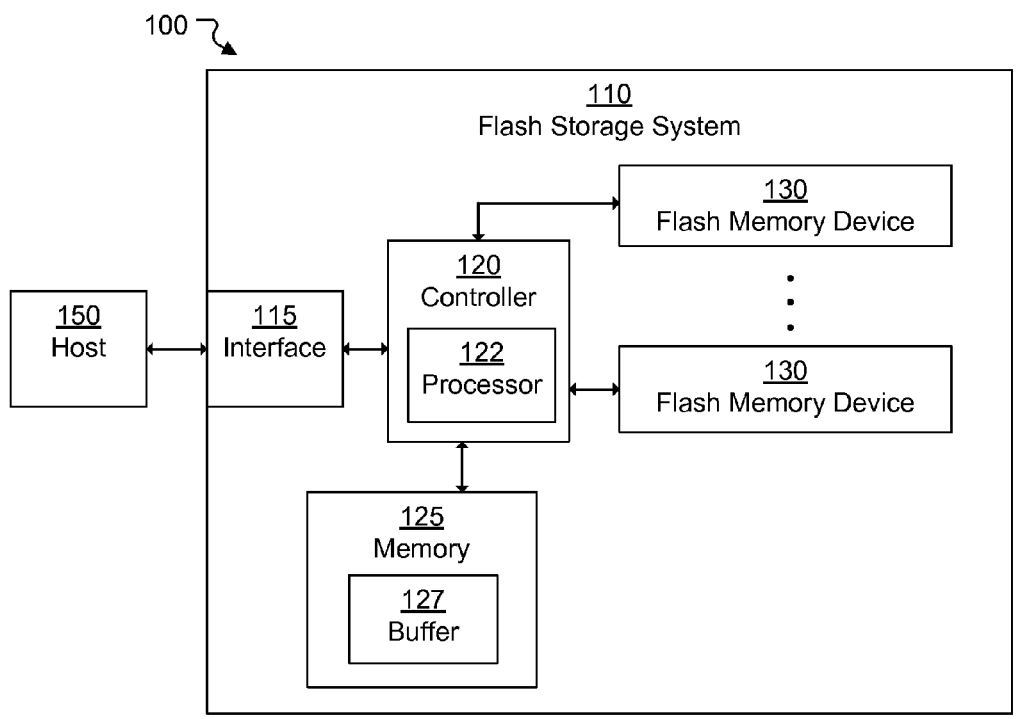
FIG. 1 is a block diagram illustrating components of a flash storage system according to aspects of the subject technology.

FIG. 1 is a block diagram illustrating components of a flash storage system 110 according to aspects of the subject technology. As depicted in FIG. 1, the flash storage system 110 includes an interface 115, a controller 120, flash memory devices 130, and a memory 125. The interface 115 facilitates communication of data, commands, and/or control signals between the flash storage system 110 and a host 150. The controller 120 controls the operation of the flash storage system 110 to store and retrieve data in the flash memory devices 130 in accordance with commands received from the host 150. The controller 120 may include a processor 122. The memory 125, which may be a random access memory (RAM), provides temporary storage space, which may include a buffer 127, for the controller 120 to process commands and transfer data between the host 150 and the flash memory devices 130. The operation of each of these components is described in more detail below.

The interface 115 provides physical and electrical connections between the host 150 and the flash storage system 110. The interface 115 is configured to facilitate communication of data, commands, and/or control signals between the host 150 and the flash storage system 110 via the physical and electrical connections. The connection and the communications with the interface 115 may be based on a standard interface such as Universal Serial Bus (USB), Small Computer System Interface (SCSI), Serial Advanced Technology Attachment (SATA), etc. Alternatively, the connection and/or communications may be based on a proprietary interface. Those skilled in the art will recognize that the subject technology is not limited to any particular type of interface.

The controller 120 manages the flow of data between the host 150 and the flash memory devices 130. The controller 120 is configured to receive commands and data from the host 150 via the interface 115. For example, the controller 120 may receive data and a write command from the host 150 to write the data in the flash memory devices 130. The controller 120 is further configured to send data to the host 150 via the interface 115. For example, the controller 120 may read data from the flash memory devices 130 and send the data to the host 150 in response to a read command. The controller 120 is further configured to manage data stored in the flash memory devices 130 and the memory 125 based on internal control algorithms or other types of commands that may be received from the host 150. For example, the controller 120 is configured to perform GC and other maintenance operations. Those skilled in the art will be familiar with other conventional operations performed by a controller in a flash storage device, which will not be described in detail herein.

The controller 120 may be implemented with a general purpose processor, micro-controller, digital signal processor (DSP), an application specific integrated circuit (ASIC), a field programmable gate array (FPGA) or other programmable logic device, discrete gate or transistor logic device, discrete hardware components, or any combination thereof designed and configured to perform the operations and functions described herein. In certain implementations, the controller 120 may include the processor 122, which may be a specialized processor for a specific operation, such as calculating a Secure Hash Algorithm (SHA). The controller 120 may perform the operations and functions described herein by executing one or more sequences of instructions stored on a machine/computer readable medium. The machine/computer readable medium may be the flash memory devices 130, the memory 125, or other types of media from which the controller 120 can read instructions or code. For example, flash storage system 110 may include a read only memory (ROM), such as an EPROM or EEPROM, encoded with firmware/software comprising one or more sequences of instructions read and executed by the controller 120 during the operation of the flash storage system 110.

The flash memory devices 130 may each be a single flash memory chip or may represent groups of multiple flash memory chips. The flash memory devices 130 may be organized among multiple channels through which data is read from and written to the flash memory devices 130 by the controller 120, or coupled to a single channel. The flash memory devices 130 may be implemented using NAND flash.

The flash memory devices 130 comprise multiple memory cells divided into storage blocks. These storage blocks may be referred to as data blocks or memory blocks and are addressable by the controller 120 using a physical block address. Each of the storage blocks is further divided into multiple data segments or pages addressable by the controller 120 using a physical page address or offset from a physical block address of the storage block containing the referenced page. The pages may store sectors or other host data units. The storage blocks represent the units of data that are erased within the flash memory devices 130 in a single erase operation. The physical pages represent the units of data that are read from or written to the flash memory devices 130 in a single read or write operation.

Figure 2:
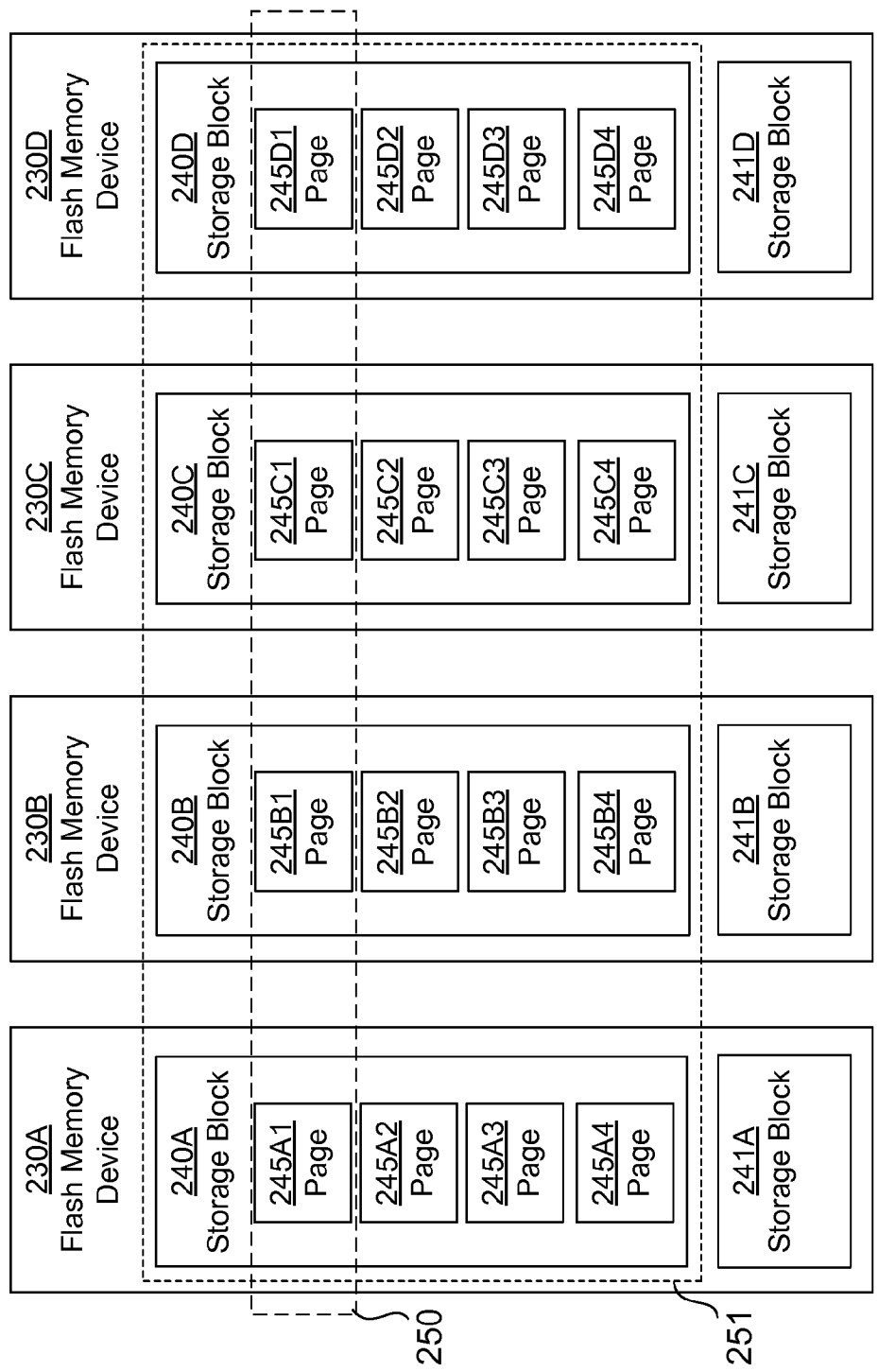
FIG. 2 is a block diagram illustrating flash memory devices according to aspects of the subject technology.

FIG. 2 shows a block diagram of flash memory devices 230A-D, which may correspond to the flash memory devices 130. The flash memory devices 230A-D include storage blocks 240A-D, respectively and blocks 241A-D, respectively. Block 240A is divided into pages 245A1-A4. Block 240B is divided into pages 245B1-B4. Block 240C is divided into pages 245C1-C4. Block 240D is divided into pages 245D1-D4. Although not shown in FIG. 2, the blocks 241A-D may be divided into pages. The pages, such as pages 245A1, 245B1, 245C1, and 245D1, across the flash memory devices 230A-D having corresponding physical addresses are called a super page or a stripe 250. The blocks, such as blocks 240A-D, across the flash memory devices 230A-D are called a super block or a band 251. Each of the flash memory devices 230A-D may be on separate channels, allowing parallel read/write operations across the channels. Those skilled in the art may recognize other terminology conventionally used to refer to these data units within a flash storage device.

The subject technology is not limited to any particular capacity of flash memory device. For example, storage blocks may each comprise 32, 64, 128, or 512 pages. Additionally, pages may each comprise 512 bytes, 2 KB, 4 KB, or 32 KB. The sectors may each comprise 4 KB, or other sizes such that sectors may be the same size as a page, or there may be multiple sectors per page.

Returning to FIG. 1, the memory 125 represents a memory coupled to and used by the controller 120 during operation of the flash storage system 110. The controller 120 may buffer commands and/or data in the memory 125. For example, the controller 120 may buffer data in the buffer 127. The buffer 127 may include transfer buffers and/or other buffers used by the controller 120. The controller 120 also may use the memory 125 to store address mapping tables or lookup tables used to convert logical data addresses used by the host 150 into virtual and/or physical addresses corresponding to portions of the flash memory devices 130. Other types of tables, data, status indicators, etc. used to manage flash storage devices also may be stored in the memory 125 by the controller 120. The memory 125 may be implemented using dynamic random access memory (DRAM), static random access memory (SRAM), or other types of volatile and non-volatile random access memory, including multiple types of memories such as DRAM and SRAM, known to those skilled in the art without departing from the scope of the subject technology.

The host 150 may be a computing device, such as a computer/server, a smartphone, or any other electronic device that reads data from and writes data to the flash storage system 110. The host 150 may have an operating system or other software that issues read and write commands to the flash storage system 110. The flash storage system 110 may be integrated with the host 150 or may be external to the host 150. The flash storage system 110 may be wirelessly connected to the host 150, or may be physically connected to the host 150.

The controller 120 is configured to perform maintenance operations on the flash memory devices 130. For example, the controller 120 may determine that GC should be performed. For example, the controller 120 may determine that a number of available blocks may be below a threshold. The controller 120 may keep track of the Program/Erase (P/E) cycles of each block, for wear leveling purposes.

Once GC is triggered, the block 240A, for example, may be selected based on the amount of invalid data units contained in the block 240A, an error count associated with the block 240A, or other parameters such as P/E cycles. For instance, even if the block 240B could be selected for GC—having a significant amount of invalid data—the block 240A may be selected instead based on the respective P/E cycles of the blocks 240A and 240B.

Figure 3:
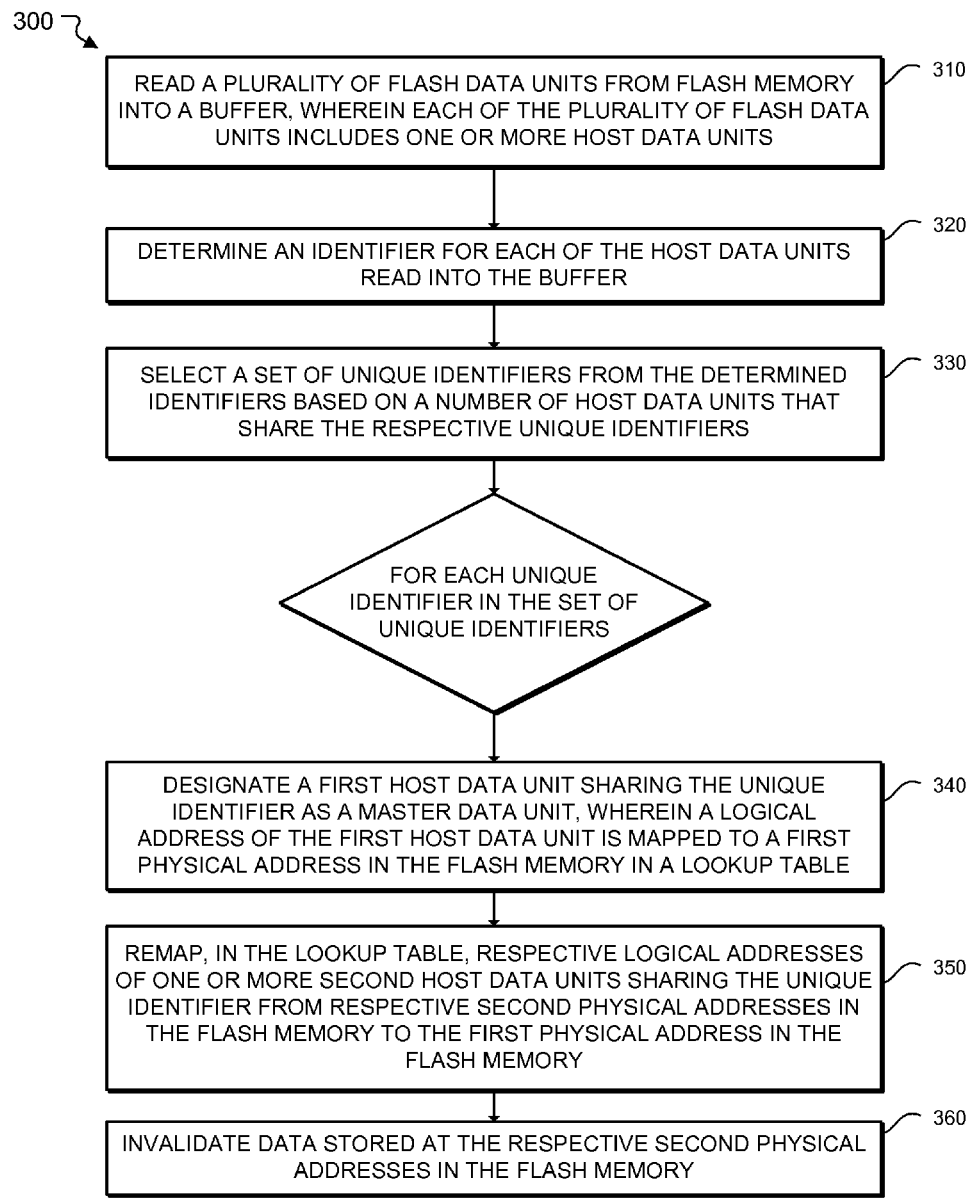
FIG. 3 is a flowchart illustrating a method for managing a flash storage system according to aspects of the subject technology.

Once the block 240A is selected for GC, the valid data from the block 240A is copied to an empty block, such as the block 240D, and the block 240A is erased. However, the controller 120 may be configured to perform deduplication before copying the valid data from the block 240A to the block 240D. FIG. 3 shows a flowchart 300 of offline deduplication, according to aspects of the subject technology.

With a block, such as the block 240A, selected for a maintenance operation, such as GC, the deduplication process may start by reading a page of the selected block, such as the page 245A1. At step 310, a plurality of flash data units are read from flash memory into a buffer, wherein each of the plurality of flash data units includes one or more host data units. For instance, the page 245A1's data may be read into the buffer 127. For better deduplication performance, more data may be read into the buffer, as analyzing more data increases a likelihood of finding duplicate data. Accordingly, the remaining pages of the band associated with the read page, for instance the band 251, may also be read into the buffer. Because the other pages of the band are on different channels, the pages may be read in parallel, such that reading the entire band may not add significant read overhead. In certain implementations, the maintenance operation may select a certain number of flash data units, such as half of a band or stripe, such that not all flash memory devices may be analyzed.

At step 320, an identifier for each of the host data units read into the buffer is determined. For instance, a hash algorithm, such as a SHA, may be applied to each host data unit to create respective digests. Although a SHA is discussed herein, other types of identifiers may be utilized rather than a SHA. The identifiers are determined such that the same data creates the same identifier, in order to identify duplicate data entries. The identifiers may be determined by the controller 120. In certain implementations, a small hardware processor, such as the processor 122, may be used to calculate the SHA. The processor 122 may be specifically configured to calculate the SHA, in order to increase performance and allow the controller 120 to perform other operations in parallel.

At step 330, a set of unique identifiers is selected from the determined identifiers based on a number of host data units that share the respective unique identifiers. The selection may be based on analyzing a data structure, such as a B tree, containing the identifiers determined in step 320. For instance, the controller 120 may construct a B tree in the memory 125 as each identifier is determined in step 320. FIG. 4A illustrates a block diagram of a node 410 used in a B tree 400 in FIG. 4B. Each node 410 includes a key 420. Each key 420 stores a digest 425, a count 430, and addresses 440. The digest 425 contains a unique identifier. The count 430 contains the number of host data units corresponding to the identifier of the digest 425. As each host data unit is examined, the count 430 is increased if the host data unit's digest matches the digest 425, and the host data unit's logical address is added to the addresses 440. The addresses 440 contains a list of logical addresses having the data corresponding to the identifier of the digest 425. The count 430 matches the number of addresses in the addresses 440. The addresses 440 may be implemented as a linked list, array, or other data structure for storing multiple elements.

FIG. 4B shows the B tree 400 containing nodes 410A, 410B, 410C, and 410D. The node 410A contains keys 420A and 420B. The node 410B contains keys 420C and 420D. The node 410C contains keys 420E and 420F. The node 410D contains keys 420G and 420H. Each of the keys 420A, 420B, 420C, 420D, 420E, 420F, 420G, and 420H contain respective digests 425, counts 430, and addresses 440, which are not shown in FIG. 4B. As a digest is generated for each host data unit examined in step 320, the controller searches for a matching digest in the B tree. If a matching digest is found in a key, the corresponding count is increased, and the logical address of the host data unit is added to the corresponding addresses. If a matching digest is not found, a new key is created.

The new key is added to the B tree based on the value of the digest. The digests may be compared, for example, by alphanumeric value, such that a first digest may be considered greater than, less than, or equal to a second digest. Starting at the root node (node 410A in FIG. 4B) as a current node, the new digest is compared to the digests of the keys for the current node. If the new digest is less than the digests of the keys of the current node, the examination continues to the child node (node 410B in FIG. 4B) having digests less than the digests of the current node. If the new digest is between the digests of the current node, the examination continues to the child node (node 410C in FIG. 4B) having digests between the appropriate digests of the current node. If the new digest is greater than the digests of the current node, the examination continues to the child node (node 410D in FIG. 4B) having digests greater than the digests of the current node. Once a node having no children is reached, the new digest is added as a new key, with the new digest, a new count of 1, and the logical address of the host data unit. Depending on the order of the B tree, the new key may cause the node to exceed a maximum number of keys, such that a new node may be created.

Once the identifiers of all the host data units are entered into the B tree, the B tree may be complete. The set of unique identifiers may be selected based on the count values stored with each key. For example, the identifiers corresponding to the largest counts may be selected. A threshold number of identifiers, such as 16, may be selected, or a threshold percentage of the total number of host data units examined, such as 15%, may be used to select the identifiers having counts which in aggregate reach the threshold percentage without exceeding the threshold percentage.

Alternatively, only identifiers having counts greater than a lower threshold count may be selected, to prevent selection of identifiers having too small of a count for a deduplication benefit. For instance, the 16 largest counts may include a count of two, which may not provide significant deduplication. Identifiers having counts greater than an upper threshold count may be excluded as well. Although deduplicating a large count would provide increased storage efficiency, data management may become burdensome. If the count is large enough, then multiple read commands may require reading from the same physical address within a short time period, which may create a bottleneck and cause read delay. For instance, if every host data unit contained the same data, then all read commands would require access to one physical address.

For each unique identifier in the set of unique identifiers, steps 340, 350, and 360 are performed. At step 340, a first host data unit sharing the unique identifier is designated as a master data unit, wherein a logical address of the first host data unit is mapped to a first physical address in the flash memory in a lookup table. FIG. 5A shows a lookup table 500, storing logical block addresses (LBA) 510 mapped to physical block addresses (PBA) 520. The master data unit's PBA stores the one copy (or master copy) of the host data unit. In addition, a backtrace table, such as a backtrace table 550 having PBAs 560 and LBAs 570 shown in FIG. 5B, is updated in order to maintain reverse mappings from the PBA to LBAs. The backtrace table 550 may be implemented with linked lists or arrays for storing the multiple LBAs per PBA.

At step 350, respective logical address of one or more second host data units sharing the unique identifier are remapped from respective second physical addresses in the flash memory to the first physical address in the flash memory. In FIG. 5A, the LBA 12 corresponds to the master data unit, and has the same data as LBAs 98 and 105. LBA 98 is mapped to PBA 16, and LBA 105 is also mapped to PBA 16. In certain implementations, the deduped entries 12, 98, and 105 may be flagged with a dedupe flag. In certain implementations, the master data unit entry may be flagged as a master data unit. The backtrace table is also updated. In FIG. 5B, the PBA 16 is mapped to LBAs 12, 98, and 105. The backtrace table shows which LBAs are mapped to a given PBA, which may be utilized when later updating data stored in a PBA.

At step 360, data stored at the respective second physical addresses in the flash memory are invalidated. Because the LBAs for the deduped entries point to the master data unit's PBA, the PBAs previously pointed to may be later freed. The maintenance operation, such as the GC operation in which the flash data unit was originally selected, may continue. Because deduped PBAs are now marked invalid, there may be less valid data to copy for the GC operation than there was before the deduplication. In other words, more invalid host data units may be claimed for GC.

In addition, the B tree may be deleted from memory after the deduplication is complete. Because the dedupe operation is not inline, the B tree does not need to be maintained for new write commands, and the memory may be freed for other operations. If a deduped band is later selected for dedupe, the B tree may be recreated based on the backtrace table and/or the dedupe flagged entries in the lookup table.

Figures 6A, 7A, 7B:
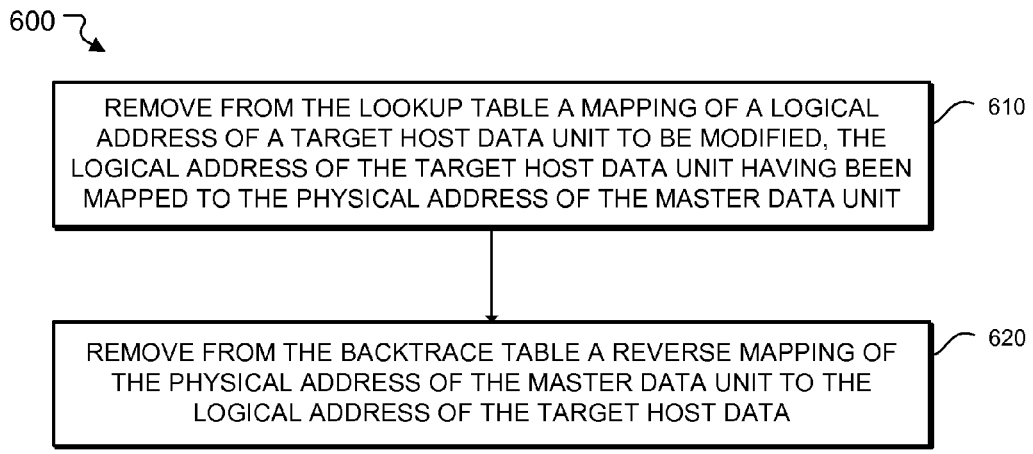
FIG. 6A is a flowchart illustrating a method for updating deduplication entries according to aspects of the subject technology.
FIG. 7A is a diagram of a modified lookup table according to aspects of the subject technology.
FIG. 7B is a diagram of a modified backtrace table according to aspects of the subject technology.

As data in the flash storage system is modified, such as being updated or erased, deduped LBAs may require updating. FIGS. 6A and 6B illustrate processes updating dedupe entries of a target host data unit to be modified. For example, the host may issue a write command for updating data for the LBA of the target host data unit. Alternatively, the host may issue an erase command for erasing data for the target host data unit's LBA. If the lookup table entry for the target host data unit includes a dedupe flag, the dedupe updating process may be triggered. Alternatively, the PBA of the target host data unit may be found in the backtrace table to trigger the dedupe updating process.

FIG. 6A illustrates a flowchart 600 of removing/overwriting a dedupe entry. For example, the host may issue a command deleting or overwriting an LBA. At step 610, a mapping of a logical address of a target host data unit is removed from a lookup table for the target host data unit to be modified, the logical address of the target host data unit having been mapped to the physical address of the master data unit. For example, FIG. 7A shows a lookup table 700 having LBAs 702 mapped to PBAs 704, similar to the lookup table 500 in FIG. 5A. The target host data unit may correspond to LBA 105. The LBA 105 is no longer mapped to PBA 16 (as compared to FIG. 5A). The LBA 105 may no longer be mapped to a PBA, or may be remapped to another PBA (not shown in FIG. 7A). If the LBA 105 no longer maps to a master PBA (e.g., is no longer a dedupe entry), the dedupe flag for the LBA 105 may be unset.

At step 620, a reverse mapping of the physical address of the master data unit to the logical address of the target host data is removed from the backtrace table. When the target host data unit is not a master data unit, the corresponding PBA is unaffected, and the respective entries in the lookup table and the backtrace table are updated. For instance, FIG. 7B shows a backtrace table 710 having PBAs 712 mapped to LBAs 714, similar to the backtrace table 550 in FIG. 5B. The PBA 16 is no longer mapped to the LBA 105 (as compared to FIG. 5B). In certain implementations, a dedupe entry may be erased using the process of FIG. 6A, when the master PBA does not have to be erased. For example, if the LBA 12 were to be removed, the other LBAs, such as the LBA 98, would still maintain the PBA 16 as the master PBA. By updating the lookup and backtrace tables without changing the master PBA, no data is copied or moved.

FIG. 6B illustrates a flowchart 602 of removing/overwriting a master dedupe entry. A GC or other maintenance operation may ultimately require erasing a master PBA, such as erasing a block corresponding to the master PBA after copying the data from the master PBA to a new PBA. Unlike the process shown in FIG. 6A, the master PBA will be modified. At step 612, data from a physical address of a target host data unit is copied to a new physical address, wherein the target host data unit is to be modified and the target host data unit is designated as the master data unit. When the target host data unit is the master data unit, the copy of data at the corresponding PBA must be copied to a new PBA in order to ensure other dedupe host data units sharing the data can still reference the data. FIG. 7C shows a lookup table 720 having LBAs 722 mapped to PBAs 724, similar to the lookup table 500 in FIG. 5A. FIG. 7D shows a backtrace table 730 having PBAs 732 mapped to LBAs 734, similar to the backtrace table 550 in FIG. 5B. The master PBA may be 32, and the new physical address may be 40.

At step 622, a host data unit of the new physical address is designated as the master data unit. For instance, PBA 40 may be designated as the new master data unit.

At step 632, respective logical addresses of the second host data units are remapped to the new physical address in the lookup table. For example, in FIG. 7C, LBAs 12, 98, and 105 are now mapped to PBA 40 (as compared to FIG. 5A).

At step 642, reverse mappings of the physical address of the target host data unit are updated, in the backtrace table, to reverse mappings of the new physical address. In the backtrace table, the old master PBA is updated to the new master PBA. For example, in FIG. 7D, PBA 16 is now replaced with PBA 40 (as compared to FIG. 5B).

At step 652, the data stored at the physical address of the target host data unit is invalidated. The old master PBA is marked as invalid to complete the modification. The invalidated PBA may later be erased and freed in a GC operation. In certain implementations, the processes of flowchart 600 and 602 may be combined in order to modify a specific data unit. For instance, if a particular deduped LBA and PBA were to be modified, the processes of flowchart 600 and 602 may be utilized to update the lookup and backtrace tables.

Deduplication for the flash storage system may be enabled by a user, for example, through a user interface accessible through the host. The user interface may be implemented as an application or as a webpage accessible through a browser on the host. The user may also select certain options or parameters for deduplication of the flash storage system. For instance, a percentage of dedupe capability may be selected such that a threshold percentage of the total available space of the flash storage system may be deduped. Once the threshold percentage has been deduped, the flash storage system may not further dedupe data, unless the percentage falls below the threshold percentage. In addition, certain dedupe patterns may be stored normally without deduplication. For example, the user may designate specific data patterns that would not be selected for deduplication. Such patterns may include common patterns (such as all zeros), which may create significant read latency or management burdens. Deduplication may be disabled by the user, which may require formatting the flash storage system.

Deduplication may be prioritized for cold bands of data. The flash storage system may keep track of hot data bands, for example based on the frequency of LBAs' data changing. Performing dedupe on cold data minimizes bookkeeping, such as updating the lookup table and backtrace table. Because cold data may be updated less frequently, master data units may be updated less frequently, which may reduce write amplification. For example, when GC selects a band, deduplication may not be performed if the band is considered hot.

Deduplication may increase read amplification, as additional reads may be needed to read data for deduped entries. However, because less writes are required, and less storage space is utilized, the frequency of GC or other maintenance operations may be reduced, and the overall lifetime of the flash storage system may be increased. In addition, because the deduplication is not performed during host write operations, the deduplication does not add latency to host write operations. Because copying the valid data requires writing data, reducing the amount of data written may increase the lifespan of the corresponding flash memory device.

Offline deduplication may be easier to interrupt than inline deduplication. For example, with offline dedupe, data is already stored on the flash storage device, and the mappings are updated. If a new read command is received during offline deduplication, the data may be read, because the data is still stored as previously written, or the mappings may have already been updated through dedupe. If a new write command is received during offline deduplication, the data is generally written to a new physical address, rather than the physical addresses being examined for dedupe. During offline dedupe, the GC commands may have lower priority over host write commands, providing greater performance benefits to the host. In addition, deduplication may optimize storage utilization as more free space may be available.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology.

A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for managing a flash storage system, comprising:
   reading a plurality of flash data units from flash memory into a buffer, wherein each of the plurality of flash data units includes one or more host data units;
   determining an identifier for each of the host data units read into the buffer;
   selecting a set of unique identifiers from the determined identifiers based on a number of host data units that share the respective unique identifiers, wherein the set of unique identifiers excludes determined identifiers having a number of host data units that satisfy an upper threshold count; and
   for each unique identifier in the set of unique identifiers:
      designating a first host data unit sharing the unique identifier as a master data unit, wherein a logical address of the first host data unit is mapped to a first physical address in the flash memory in a lookup table;
      remapping, in the lookup table, respective logical addresses of one or more second host data units sharing the unique identifier from respective second physical addresses in the flash memory to the first physical address in the flash memory; and
      invalidating data stored at the respective second physical addresses in the flash memory.

2. The method of claim 1, wherein the plurality of flash data units are read from the flash memory into the buffer in response to a system maintenance operation, and
   wherein the method further comprises performing the system maintenance operation after the data stored at the respective second physical address has been invalidated.

3. The method of claim 1, wherein the method further comprises:
   populating a data structure based on the determined identifiers of the host data units, wherein the data structure includes an entry for each unique identifier of the determined identifiers, and wherein each entry includes a count of host data units sharing the respective unique identifier and a logical address of each host data unit sharing the respective unique identifier,
   wherein the set of unique identifiers is selected by traversing the entries of the data structure and selecting a predetermined number of unique identifiers having the largest counts of host data units less than the upper threshold count.

4. The method of claim 3, wherein the largest counts of host data units are greater than a lower threshold count.

5. The method of claim 3, wherein the data structure comprises a B tree, and wherein each entry comprises a respective key of the B tree.

6. The method of claim 1, further comprising, for each unique identifier in the set of unique identifiers:
   storing, in a backtrace table, respective reverse mappings of the first physical address to the logical address of the first host data unit and the respective logical addresses of the one or more second host data units.

7. The method of claim 6, further comprising:
   removing from the lookup table a mapping of a logical address of a target host data unit to be modified, the logical address of the target host data unit having been mapped to the physical address of the master data unit; and
   removing from the backtrace table a reverse mapping of the physical address of the master data unit to the logical address of the target host data.

8. The method of claim 6, further comprising:
   copying data from a physical address of a target host data unit to a new physical address, wherein the target host data unit is to be modified and the target host data unit is designated as the master data unit;

designating a host data unit of the new physical address as the master data unit;

remapping, in the lookup table, respective logical addresses of the second host data units to the new physical address;

updating, in the backtrace table, reverse mappings of the physical address of the target host data unit to reverse mappings of the new physical address; and invalidating data stored at the physical address of the target host data unit.

9. The method of claim 1, further comprising:

for each logical address associated with a unique identifier from the set of unique identifiers, setting a dedupe flag in an entry corresponding to the logical address in the lookup table, wherein the dedupe flag indicates the logical address is mapped to a unique respective physical address.

10. The method of claim 1, wherein the plurality of flash data units comprises respective flash data units from a plurality of flash memory devices of the flash storage system, and wherein the respective flash data units from the plurality of flash memory devices are selected in response to a system maintenance operation.

11. A flash storage system comprising:

a plurality of flash memory devices;

a memory comprising a buffer; and a controller configured to:

read a plurality of flash data units from the plurality of flash memory devices into the buffer, wherein each of the plurality of flash data units includes one or more host data units;

determine an identifier for each of the host data units read into the buffer;

select a set of unique identifiers from the determined identifiers based on a number of host data units that share the respective unique identifiers, wherein the set of unique identifiers excludes determined identifiers having a number of host data units that satisfy an upper threshold count; and for each unique identifier in the set of unique identifiers:

designate a first host data unit sharing the unique identifier as a master data unit, wherein a logical address of the first host data unit is mapped to a first physical address in the flash memory device in a lookup table;

remap, in the lookup table, respective logical addresses of one or more second host data units sharing the unique identifier from respective second physical addresses in the flash memory device to the first physical address in the flash memory device; and invalidate data stored at the respective second physical addresses in the flash memory device.

12. The flash storage system of claim 11, wherein the controller is configured to read the plurality of flash data units from the plurality of flash memory devices into the buffer in response to a system maintenance operation, and wherein the controller is further configured to perform the system maintenance operation after the data stored at the respective second physical address has been invalidated.

13. The flash storage system of claim 11, wherein the controller is further configured to:

populate a data structure in the memory based on the determined identifiers of the host data units, wherein the data structure includes an entry for each unique identifier of the determined identifiers, and wherein each entry includes a count of host data units sharing the respective unique identifier and a logical address of each host data unit sharing the respective unique identifier, wherein the set of unique identifiers is selected by traversing the entries of the data structure and selecting a predetermined number of unique identifiers having the largest counts of host data units less than the upper threshold count.

14. The flash storage system of claim 13, wherein the largest counts of host data units are greater than a lower threshold count.

15. The flash storage system of claim 13, wherein the data structure comprises a B tree, and wherein each entry comprises a respective key of the B tree.

16. The flash storage system of claim 11, wherein controller is further configured to, for each unique identifier in the set of unique identifiers:

store, in a backtrace table, respective reverse mappings of the first physical address to the logical address of the first host data unit and the respective logical addresses of the one or more second host data units.

17. The flash storage system of claim 16, wherein the controller is further configured to:

remove from the lookup table a mapping of a logical address of a target host data unit to be modified, the logical address of the target host data unit having been mapped to the physical address of the master data unit; and remove from the backtrace table a reverse mapping of the physical address of the master data unit to the logical address of the target host data.

18. The flash storage system of claim 16, wherein the controller is further configured to:

copy data from a physical address of a target host data unit to a new physical address, wherein the target host data unit is to be modified and the target host data unit is designated as a master data unit;

designate a host data unit of the new physical address as the master data unit;

remap, in the lookup table, respective logical addresses of the second host data units to the new physical address;

update, in the backtrace table, reverse mappings of the physical address of the target host data unit to reverse mappings of the new physical address; and invalidate data stored at the physical address of the target host data unit.

19. The flash storage system of claim 11, wherein the controller is further configured to:

for each logical address associated with a unique identifier from the set of unique identifiers, set a dedupe flag in an entry corresponding to the logical address in the lookup table, wherein the dedupe flag indicates the logical address is not mapped to a unique respective physical address.

20. The flash storage system of claim 11, wherein the plurality of flash data units comprises respective flash data units of the plurality of flash memory devices, and wherein the respective flash data units from the plurality of flash memory devices are selected in response to a system maintenance operation.

21. A non-transitory machine-readable medium comprising instructions stored therein, which when executed by a machine, cause the machine to perform operations comprising:

reading a plurality of flash data units from flash memory into a buffer, wherein each of the plurality of flash data units includes one or more host data units;

determining an identifier for each of the host data units read into the buffer;

selecting a set of unique identifiers from the determined identifiers based on a number of host data units that share the respective unique identifiers, wherein the set of unique identifiers excludes determined identifiers having a number of host data units that satisfy an upper threshold count; and for each unique identifier in the set of unique identifiers:
  designating a first host data unit sharing the unique identifier as a master data unit, wherein a logical address of the first host data unit is mapped to a first physical address in the flash memory in a lookup table;
  remapping, in the lookup table, respective logical addresses of one or more second host data units sharing the unique identifier from respective second physical addresses in the flash memory to the first physical address in the flash memory; and
  invalidating data stored at the respective second physical addresses in the flash memory.

22. The non-transitory machine-readable medium of claim 21, wherein the instructions further cause the machine to perform operations comprising:
  populating a data structure based on the determined identifiers of the host data units, wherein the data structure includes an entry for each unique identifier of the determined identifiers, and wherein each entry includes a count of host data units sharing the respective unique identifier and a logical address of each host data unit sharing the respective unique identifier,
  wherein the set of unique identifiers is selected by traversing the entries of the data structure and selecting a predetermined number of unique identifiers having the largest counts of host data units less than the upper threshold count.

23. The non-transitory machine-readable medium of claim 21, wherein the plurality of flash data units are read from the flash memory into the buffer in response to a garbage collection operation.

* * * * *